Aug. 28, 1951

H. P. MICHAELSEN 2,565,979

REMOTELY CONTROLLED VENETIAN
BLIND FOR AUTO REAR WINDOWS

Filed Sept. 26, 1947

TO INTAKE MANIFOLD

INVENTOR.
HARRY P. MICHAELSEN

BY
Randolph & Beavers
Attorneys

Aug. 28, 1951     H. P. MICHAELSEN     2,565,979
REMOTELY CONTROLLED VENETIAN
BLIND FOR AUTO REAR WINDOWS
Filed Sept. 26, 1947     2 Sheets-Sheet 2
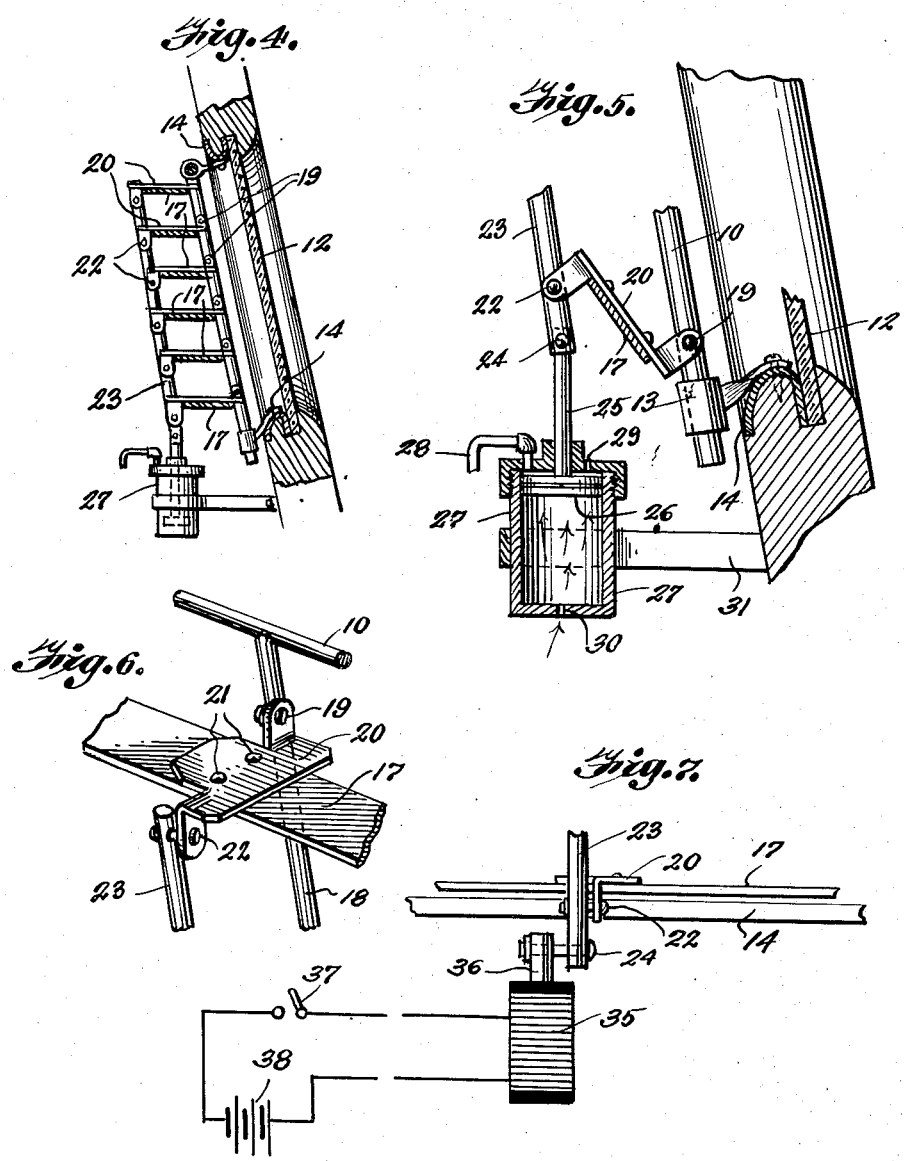
Inventor
HARRY P. MICHAELSEN
By Randolph & Beavers
Attorneys Patented Aug. 28, 1951

2,565,979

UNITED STATES PATENT OFFICE 2,565,979

REMOTELY CONTROLLED VENETIAN BLIND FOR AUTO REAR WINDOWS

Harry P. Michaelsen, Taft, Calif.

Application September 26, 1947, Serial No. 776,259

1 Claim. (Cl. 268—96)

The present invention relates to remotely controlled Venetian blind for auto rear windows and it consists in the combinations, constructions and arrangements of parts herein described and claimed.

It is an object of the invention to provide a Venetian blind which may be readily and easily controlled from a remote point.

A further object of the invention is to provide a Venetian blind for the rear window of an automobile which may be power operated by simple means at the control of the driver.

Another object of the invention is the provision of means whereby the rays of glaring headlights of a following car may be quickly cut off by a driver by extremely simple means.

Other and further objects of the invention will become apparent from a reading of the following specification taken in conjunction with the drawings, in which:

Figure 3 is a sectional view taken along line 3—3 of Figure 1,

Figure 4 is a sectional view taken along line 4—4 of Figure 1,

Figure 5 is a fragmentary view, partly in section, showing details of the invention, Figure 6 is a fragmentary perspective view showing a certain element of the invention, Figure 7 is a fragmentary elevational view, partly schematic, showing a modified form the invention may take, and Figure 8 is a fragmentary perspective view showing another element of the invention.

Figure 1:
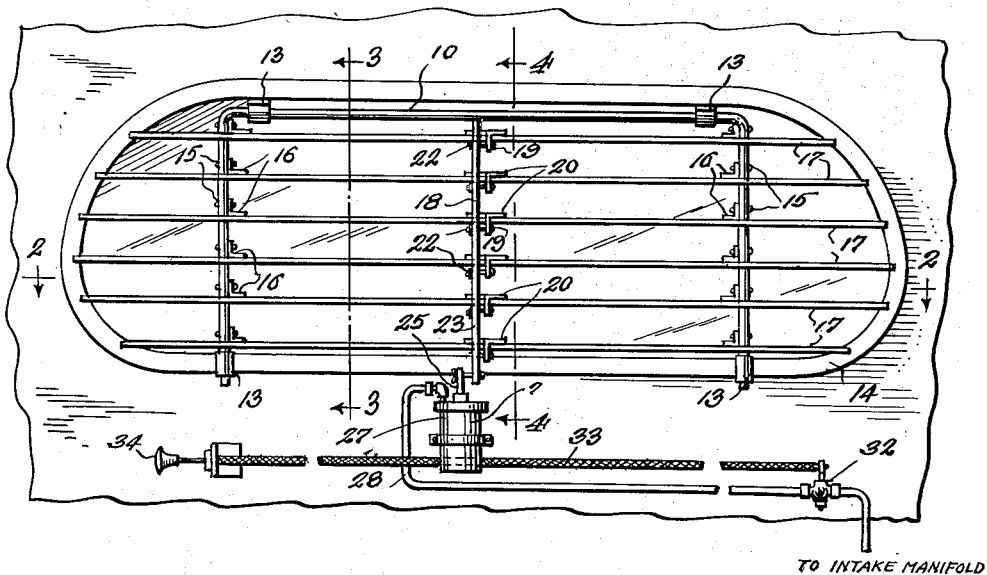
Figure 1 is an elevational view of an embodiment of the invention.
Figure 2:
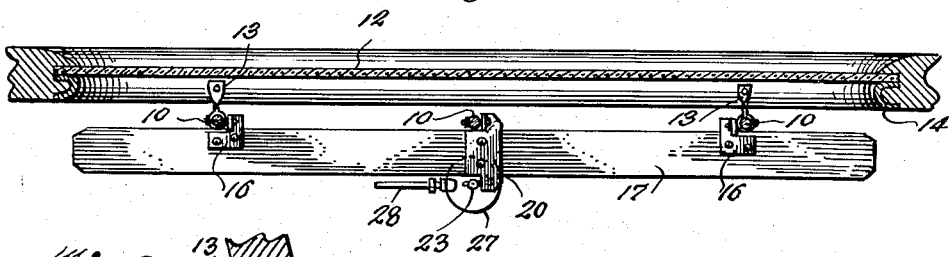
Figure 2 is a sectional view taken along line 2—2 of Figure 1.
Figure 2:
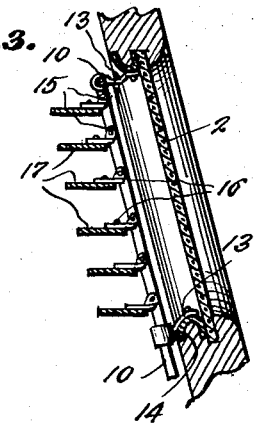
Figure 2:
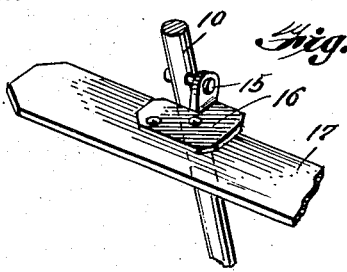

Generally there is provided a set of Venetian blinds which is adapted to be mounted upon the frame of the rear window of an automobile and the slats of which normally lie in a horizontal plane. A rod interconnects the slats and is adapted to be actuated by means of a piston in a cylinder to move the slats to a closed position when the cylinder is operatively connected with the lowered pressure of the engine manifold by a valve controlled by the car's operator. A solenoid may be substituted for the cylinder and its associated parts. The slats are adapted to resume normal horizontal position by gravity.

Referring now more particularly to the drawings, there is shown therein a Venetian blind having an inverted U-shaped frame member 10 which is held in position adjacent the rear window 12 of an automobile by means of brackets 13 to the framework 14 thereof.

To the upright portions of the frame 10 is hinged, as indicated at 15, brackets 16 carried by slats 17.

Dependent from the frame member at the upper central portion thereof is a vertical leg 18 to which is pivotally connected, as indicated at 19, a series of plates 20 centrally affixed, as indicated at 21, to the slats 17 and pivotally connected at their other ends, as shown at 22, to a vertically extending rod 23.

A pin 24 pivotally connects the rod 23 with a piston rod 25 connected with a piston 26 vertically slidable in a cylinder 27 to the upper end of which is connected a pipe line 28 whose other end connects with the intake manifold of the car.

An opening 29 is formed in the upper end of the cylinder 27 and an opening 30 is formed in the lower end thereof. A bracket 31 holds the cylinder in position immediately below the window 12.

A valve 32 is positioned in the pipe line 28 and is connected by a cable 33 to a handle 34 mounted upon the dashboard of the car or at some other place convenient to the driver thereof.

In Figure 7 there is shown a modified form of the invention in which, instead of the cylinder and its associated parts, a solenoid 35 has its core 36 connected in the manner of the piston rod 25. The solenoid is actuated by a switch 37 from the battery 38 of the car.

In both forms of the invention the operation is identical. The slots 17 will normally lie in a horizontal plane by their own weight, the brackets 16 only allowing a downward movement to such horizontal position. In such horizontal plane the driver of the car is permitted a clear view through the window 12 ordinarily but not necessarily using his rear view mirror for this purpose. Whenever the driver wishes to close the blinds, however, it is only necessary for him to open the valve 32 by moving the handle 34 through the medium of the cable 33. This will cause the partial vacuum in the intake manifold to be communicated to the upper side of the piston 26 thereby causing the same to rise and thus lifting the rod 23 and therefore the slats 27 to a substantially vertical plane thereby cutting off from the driver's view any rays of light passing through the window 12. The same effect is attained by closing the switch 37 thus actuating the solenoid 35 and causing the core 36 to rise.

To again lower the slats to horizontal position it is only necessary to close the valve 32 thereby allowing normal atmospheric pressure again to effect both sides of the piston due to the openings 29 and 30 and thereby allowing the slats 17 and their attendant parts to resume normal positions due to gravity. Again, opening the switch 37 will give the identical effect.

While but two forms of the invention have been shown and described herein, it will be readily apparent to those skilled in the art that many minor modifications may be made without departing from the spirit of the invention or the scope of the appended claim.

What is claimed is:

A device of the character described including a vertical frame member, a plurality of laterally extending slats each provided with a bracket having its outer end pivotally connected to said frame member, said slats normally abutting said frame member to normally lie in a horizontal plane, a vertically extending rod pivotally connected to the outer ends of the slats, and means for moving the rod upwardly whereby to place the slats in substantially vertical planes, said means including a piston for actuating the rod and a cylinder for actuating the piston.

HARRY P. MICHAELSEN.

REFERENCES CITED

The following references are of record in the file of this patent:

UNITED STATES PATENTS

| Number | Name | Date |
|---|---|---|
| 189,292 | Whipple | Apr. 3, 1877 |
| 342,124 | Naylor | May 18, 1886 |
| 1,791,151 | Tarvid | Feb. 3, 1931 |
| 2,371,154 | Cuthill et al. | Mar. 13, 1945 |
| 2,514,272 | Winkelmann | July 4, 1950 |